(12) United States Patent
Ji et al.

(10) Patent No.: US 12,382,457 B2
(45) Date of Patent: Aug. 5, 2025

(54) SEARCH SPACE MONITORING METHOD AND DEVICE

(71) Applicant: VIVO MOBILE COMMUNICATION CO., LTD., Guangdong (CN)

(72) Inventors: Zichao Ji, Guangdong (CN); Gen Li, Guangdong (CN); Xueming Pan, Guangdong (CN); Siqi Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 431 days.

(21) Appl. No.: 17/882,233

(22) Filed: Aug. 5, 2022

(65) Prior Publication Data

US 2022/0408465 A1 Dec. 22, 2022

Related U.S. Application Data

(63) Continuation of application No. PCT/CN2021/074919, filed on Feb. 2, 2021.

(30) Foreign Application Priority Data

Feb. 6, 2020 (CN) .......................... 202010082038.3

(51) Int. Cl.
*H04W 72/20* (2023.01)
(52) U.S. Cl.
CPC .................. *H04W 72/20* (2023.01)
(58) Field of Classification Search
None
See application file for complete search history.

(56) References Cited

U.S. PATENT DOCUMENTS

| | | | |
|---|---|---|---|
| 2010/0098037 A1 | 4/2010 | Li et al. | |
| 2013/0058240 A1 | 3/2013 | Kim et al. | |
| 2017/0135127 A1 | 5/2017 | Nogami et al. | |
| 2018/0152954 A1 | 5/2018 | Golitschek Edler Von Elbwart | |
| 2019/0090267 A1 | 3/2019 | Li | |
| 2020/0015229 A1* | 1/2020 | Yang | H04W 72/0446 |
| 2020/0245302 A1 | 7/2020 | Pan et al. | |
| 2020/0305179 A1 | 9/2020 | Li | |

(Continued)

FOREIGN PATENT DOCUMENTS

| | | |
|---|---|---|
| CN | 102104866 A | 6/2011 |
| CN | 102934383 A | 2/2013 |

(Continued)

OTHER PUBLICATIONS

Extended European Search Report for Application No. 21750196.4-1213, dated Jun. 29, 2023, 9 Pages.

(Continued)

*Primary Examiner* — Christine T Duong
(74) *Attorney, Agent, or Firm* — BROOKS KUSHMAN P.C.

(57) ABSTRACT

A search space monitoring method and a device are disclosed. The method is executed by a terminal device, and a plurality of transmission objects are configured for the terminal device. The method includes: obtaining scheduling configuration information; and monitoring an SS based on the scheduling configuration information, where the SS includes an SS in which at least two transmission objects schedule one transmission object.

20 Claims, 3 Drawing Sheets

100

Obtain scheduling configuration information — S102

Monitor an SS based on the scheduling configuration information, where the SS includes an SS in which at least two transmission objects schedule one transmission object — S104

(56) References Cited

U.S. PATENT DOCUMENTS

| | | | |
|---|---|---|---|
| 2020/0351926 A1* | 11/2020 | Bagheri | ............... H04W 72/23 |
| 2020/0366533 A1 | 11/2020 | Ji | |
| 2021/0144571 A1 | 5/2021 | Ji | |
| 2021/0227572 A1 | 7/2021 | Maio et al. | |

FOREIGN PATENT DOCUMENTS

| | | | |
|---|---|---|---|
| CN | 105682243 A | 6/2016 |
| CN | 105682244 A | 6/2016 |
| CN | 109391971 A | 2/2019 |
| CN | 110166191 A | 8/2019 |
| CN | 110324127 A | 10/2019 |
| CN | 110677911 A | 1/2020 |
| CN | 110740514 A | 1/2020 |
| EP | 3435721 A1 | 1/2019 |
| EP | 3826397 A1 | 5/2021 |
| JP | 2018522452 A | 8/2018 |
| KR | 20110112789 A | 10/2011 |
| WO | 2011126329 A2 | 10/2011 |
| WO | 2011126329 A3 | 1/2012 |
| WO | 2017026086 A1 | 2/2017 |
| WO | 2019237929 A1 | 12/2019 |
| WO | 2020015730 A1 | 1/2020 |

OTHER PUBLICATIONS

ZTE Corporation "Discussion on cross-carrier scheduling with different numerologies" 3GPP TSG RAN WG1 Ad-Hoc Meeting 1901, Taipei, Jan. 2019, R1-1900082, 8 Pages.

First Office Action for Japanese Application No. 2022-548202, dated Jul. 25, 2023, 5 Pages.

Vivo "Remaining issues on search space design" 3GPP TSG RAN WG1 Meeting #90bis, Prague, Czech Republic, Oct. 2017, R1-1717484, 9 Pages.

First Office Action for Chinese Application No. 202010082038.3, dated Jul. 29, 2022, 14 Pages.

International Search Report and Written Opinion for Application No. PCT/CN2021/074919, dated Aug. 19, 2021, 7 Pages.

ZTE, "PDCCH/EPDCCH Enhancements for Carrier Aggregation," 3GPP TSG RAN WG1 Meeting #80, Agenda item 7.2.2.2.1, Feb. 9-13, 2015, R1-150137, Athens, Greece, 3 Pages.

ZTE, "Discussion on Scheduling Combinations for LAA," 3GPP TSG RAN WG1 Meeting #82, Agenda item 7.2.4.3, Aug. 24-28, 2015, R1-154320, Beijing, China, 3 Pages.

First Office Action for Korean Application No. 10-2022-7030494, dated Feb. 5, 2025, 14 Pages.

NTT DOCOMO et al. "Search space configuration for cross carrier scheduling" 3GPP TSG-RAN2 Meeting #105, Athens, Greece, Mar. 2019, R2-1902542, 10 Pages.

* cited by examiner

SEARCH SPACE MONITORING METHOD AND DEVICE

CROSS-REFERENCE TO RELATED APPLICATIONS

This application is a continuation of International Application No. PCT/CN2021/074919 filed on Feb. 2, 2021, which claims priority to Chinese Patent Application No. 202010082038.3, filed on Feb. 6, 2020, which are incorporated herein by reference in their entireties.

TECHNICAL FIELD

Embodiments of the present disclosure relate to the communications field, and in particular, to a search space monitoring method and a device.

BACKGROUND

A 5G NR system supports carrier aggregation (CA) to configure and activate multiple carriers (CC) or cells for terminal devices, and support cross-carrier scheduling in a CA scenario. In addition, the NR supports a multi-transmission panel (multiple Transmission and Reception Panel, M-TRP) scenario, and a terminal device can be scheduled by using a plurality of TRPs for data transmission and reception. However, in release-15 NR, one cell can be scheduled only by one scheduling cell (that is, being scheduled by itself or by another cell), and a PCell can be scheduled only by a primary cell (PCell).

In order to enhance coverage of a control channel, the PCell is generally deployed on a low-band carrier. Due to an insufficient bandwidth of the low-band carriers that have been deployed in other series (such as LTE), the PCell has a limited control channel capacity, and therefore such scheduling manner in the related art is difficult to resolve the problem of the limited control channel capacity of the PCell.

SUMMARY

According to a first aspect, a search space monitoring method is provided, where the method is executed by a terminal device, a plurality of transmission objects are configured for the terminal device, and the method includes:
obtaining scheduling configuration information; and
monitoring a search space SS based on the scheduling configuration information, where the SS includes an SS in which at least two transmission objects schedule one transmission object.

According to a second aspect, a search space monitoring method is provided, where the method is executed by a network device, and the method includes:
sending scheduling configuration information; where
the scheduling configuration information is used for monitoring an SS by a terminal device, a plurality of transmission objects are configured for the terminal device, and the SS includes an SS in which at least two transmission objects schedule one transmission object.

According to a third aspect, a terminal device is provided, where a plurality of transmission objects are configured for the terminal device, and the terminal device includes:
an obtaining module, configured to obtain scheduling configuration information; and
a monitoring module, configured to monitor an SS based on the scheduling configuration information, where the SS includes an SS in which at least two transmission objects schedule one transmission object.

According to a fourth aspect, a network device is provided, where the network device includes:
a sending module, configured to send scheduling configuration information; where
the scheduling configuration information is used for monitoring an SS by a terminal device, a plurality of transmission objects are configured for the terminal device, and the SS includes an SS in which at least two transmission objects schedule one transmission object.

According to a fifth aspect, a terminal device is provided, where the terminal device includes a processor, a memory, and a computer program stored in the memory and capable of running on the processor, and when the computer program is executed by the processor, the steps of the search space monitoring method according to the first aspect are implemented.

According to a sixth aspect, a network device is provided, where the network device includes a processor, a memory, and a computer program stored in the memory and capable of running on the processor, and when the computer program is executed by the processor, the search space monitoring method according to the second aspect are implemented.

According to a seventh aspect, a computer-readable storage medium is provided, where a computer program is stored in the computer-readable storage medium, and when the computer program is executed by a processor, the search space monitoring method according to any one of the first aspect and the second aspect are implemented.

BRIEF DESCRIPTION OF DRAWINGS

The accompanying drawings described herein are intended for better understanding of this application, and constitute a part of this application. Exemplary embodiments and descriptions thereof in this application are intended to interpret this application and do not constitute any improper limitation on this application. In the accompanying drawings.

DETAILED DESCRIPTION

To make the objectives, technical solutions, and advantages of this application clearer, the following clearly describes the technical solutions in the embodiments of this application with reference to the accompanying drawings in the embodiments of this application. Obviously, the described embodiments are merely some but not all of the embodiments of this application. All other embodiments obtained by a person of ordinary skill in the art based on the embodiments of this application without creative efforts shall fall within the protection scope of this application. The term "and/or" in the embodiments of this specification represents presence of at least one of the connected objects.

It should be understood that the technical solutions in the embodiments of the present disclosure may be applied to various communications systems, such as a long term evolution (LTE) system, an LTE frequency division duplex (FDD) system, an LTE time division duplex (TDD) system, a universal mobile telecommunication system (UMTS), a worldwide interoperability for microwave access (WiMAX) communications system, a 5G system or new radio (NR), and a later evolved communications system.

In the embodiments of the present disclosure, a terminal device may include but is not limited to a mobile station (MS), a mobile terminal, a mobile phone (Mobile Telephone), user equipment (UE), a handset, a portable equipment, a vehicle, and the like. The terminal device may communicate with one or more core networks through a radio access network (RAN). For example, the terminal device may be a mobile phone (also referred to as a "cellular" phone), or a computer having a wireless communication function; or the terminal device may be a portable, pocket-sized, handheld, computer built-in, or in-vehicle mobile apparatus.

In the embodiments of the present disclosure, a network device is an apparatus deployed in a radio access network and configured to provide a wireless communication function for terminal devices. The network device may be a base station, and the base station may include forms of a macro base station, a micro base station, a relay station, an access point, and the like. Names of devices having functions of the base station may vary with systems using different radio access technologies. For example, the base station is referred to as an evolved NodeB (eNB or eNodeB) in an LTE network, or referred to as a Node B in a 3rd generation (3G) network, or a network device in a later evolved communications system. Use of the terms does not constitute any limitation.

Figure 1:
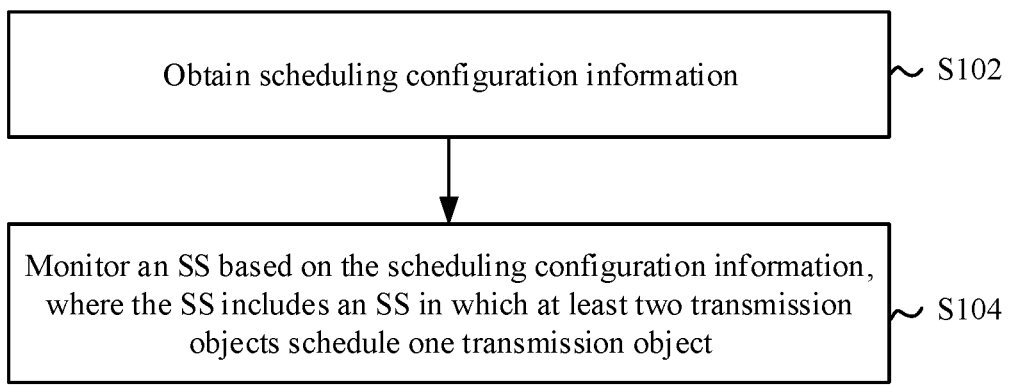
FIG. 1 is a schematic flowchart of a search space monitoring method according to an embodiment of the present disclosure.

As shown in FIG. 1, an embodiment of the present disclosure provides a search space monitoring method 100. The method may be executed by a terminal device. In other words, the method may be executed by software or hardware installed in the terminal device. The method 100 includes the following steps.

S102: Obtain scheduling configuration information.

In this embodiment of the present disclosure, a plurality of transmission objects may be configured for the terminal device, and the plurality of transmission objects may be a plurality of cells or a multi-transmission point (multiple Transmission and Reception Point, M-TRP, or referred to as multi-transmission and reception point). In other words, a search space for the transmission object is associated with a specific CORESET or CORESET pool.

Optionally, the scheduling configuration information obtained (for example, received) by the terminal device may be used to configure at least one of the following: configuration of the plurality of transmission objects, a search space (SS) to be monitored, a downlink control information (DCI) format for scheduling, and the like. The scheduling configuration information may be used to configure a scheduling relationship between the plurality of transmission objects.

S104: Monitor an SS based on the scheduling configuration information, where the SS includes an SS in which at least two transmission objects schedule one transmission object (which may also be referred to as a scheduled transmission object).

Optionally, the SS includes an SS in which at least two cells (which may be referred to as scheduling cells) schedule one cell (which may be referred to as a scheduled cell); or the SS includes an SS in which at least two TRPs (which may be referred to as scheduling TRPs) schedules one TRP (which may be referred to as a scheduled TRP).

Optionally, the plurality of transmission objects include at least a first transmission object and a second transmission object, and the SS being monitored by the terminal device includes at least one of the following:

(1) a first SS in which a transmission object (for example, the first transmission object, a third transmission object, or a fourth transmission object) other than the second transmission object in the plurality of transmission objects schedules the first transmission object, where in a case that the first transmission object schedules the first transmission object, the first SS may be referred to as an SS in which the first transmission object is self-scheduled.

(2) a second SS in which the second transmission object schedules the first transmission object; or (3) a third SS in which the second transmission object is self-scheduled.

In an example, the SS monitored by the terminal device includes the first SS in which the first transmission object is self-scheduled and the second SS in which the second transmission object schedules the first transmission object, and certainly, may also include the third SS in which the second transmission object is self-scheduled.

In another example, the SS monitored by the terminal device includes a second SS in which the second transmission object, the third transmission object, and the like schedule the first transmission object.

Optionally, in an embodiment, the monitoring an SS in S104 may be that at least one of the following is satisfied within a first specific time:

(1) a processing capability for monitoring the first SS does not exceed a maximum processing capability for a single transmission object;

(2) a total processing capability for monitoring the second SS and the third SS does not exceed a maximum processing capability for a single transmission object; or (3) a total processing capability for monitoring the second SS and the third SS does not exceed L multiplied by a maximum processing capability for a single transmission object, where L is a positive number.

Optionally, L is less than or equal to the number of transmission objects scheduled by the second transmission object.

Optionally, L is predefined; or L is related to a maximum processing capability M reported by the terminal device.

According to the search space monitoring method provided in this embodiment of the present disclosure, a plurality of transmission objects (for example, a plurality of cells or a plurality of TRPs) are configured for the terminal device, to support self-scheduling of one cell (or TRP) and scheduling by another cell (or TRP), for example, supporting both self-scheduling of a PCell and scheduling the PCell by using an SCell. This resolves the problem of a limited control channel capacity (of the PCell), thereby improving communication efficiency.

In an embodiment, a cell-1 and a cell-2 are configured for the terminal device in the embodiment 100. The cell-1 is self-scheduled, and the cell-2 can also schedule the cell-1. The terminal device monitors an SS (hereinafter referred to as SE-SS) in which the cell-1 is self-scheduled, and an SS (hereinafter referred to as CR-SS) in which the cell-2 schedules the cell-1, so as to obtain a scheduling instruction DCI for scheduling the cell-1.

In addition, the terminal device may also monitor other SSs (hereinafter referred to as O-SSs) on the cell-2 to obtain scheduling DCI for scheduling the cell-2.

Optionally, the SE-SS, CR-SS, or O-SS described in this embodiment may be a common search space (CSS) or a terminal-device specific search space (UE-specific search space, USS).

A special scenario is that no self-scheduling is for the cell-1, and one DCI-J is configured on the cell-2 to simultaneously/jointly schedule data of the cell-1 and the cell-2. In this case, DCI-2 may alternatively be configured on the cell-2 to schedule the cell-1 separately.

In the foregoing embodiment, with regard to the processing capability of the terminal device for monitoring the SS, three schemes a, b, and c are described below.

(a) Optionally, within a specific time (for example, within one slot), a processing capability of the terminal device for monitoring a PDCCH (for example, SE-SS) on the cell-1 does not exceed a maximum processing capability of the terminal device for a single cell. That is, the number of PDCCH candidates monitored by the terminal device does not exceed a maximum number of PDCCH candidates in a single cell; the number of non-overlapping control channel elements (CCE) monitored by the terminal device does not exceed a maximum number of non-overlapping CCEs in a single cell; and a maximum number of DCI formats of different sizes monitored by the terminal device does not exceed the number of DCI formats (DCI size budget) of a single cell. This holds true for the following embodiments.

The processing capability described in this embodiment is related to parameters (for example, numerology/SCS) of the scheduling cell and/or the scheduled cell, for example, being determined based on an SCS of the cell-1 or cell-2 or based on a largest or smallest one of the SCSs; and so on.

The "processing capability of the terminal device for monitoring . . . " described in this embodiment means a processing capability required for monitoring a PDCCH by the terminal device based on configuration parameters of the network device, or a processing capability required for monitoring a PDCCH by the terminal device and obtained in other manners (for example, being determined by the terminal device itself). This holds true for the following embodiments.

(b) Optionally, within a specific time, a total processing capability of the terminal device for monitoring the PDCCH (for example, the CR-SS and O-SS) on the cell-2 does not exceed a maximum processing capability of the terminal device for a single cell. (For details, refer to Embodiment 1 of the present disclosure hereinafter.)

In this embodiment, the CR-SS and the O-SS may be different SSs, or the CR-SS and the O-SS may be a same SS. In this case, different PDCCH candidates in the SSs correspond to DCI of different scheduled cells, which is identified by cell ID or CIF.

The processing capability in this embodiment is related to parameters (for example, numerology/SCS) of the scheduling cell and/or the scheduled cell, for example, being determined based on an SCS of the cell-1 or cell-2 or based on a largest or smallest one of the SCSs; and so on.

Essence of the scheme (b) lies in that part of the processing capability for the cell-2 is allocated to the cell-1, with an advantage of simple implementation. However, this may also reduce the number of candidates that can be monitored on the cell-2, while a monitoring capacity for the cell-1 is wasted, which may lead to lower scheduling flexibility.

The scheme (b) is also applicable to a scenario in which self-scheduling is not configured for the cell-1, and the cell-1 is merely scheduled by using cross-carrier scheduling DCI or joint/multi-cell scheduling DCI of the cell-2.

(c) Optionally, the total processing capability of the terminal device for monitoring the CR-SS and O-SS does not exceed (N×the maximum processing capability of the terminal device for a single cell) (For details, refer to Embodiment 2 of the present disclosure.)

Optionally, N≤the number of cells scheduled by the cell-2, for example, when the cell-2 schedules the cell-1 and the cell-2, N=2 or N=1.5.

The foregoing scheme (b) is a special case of N=1.

Optionally, N may be predefined by a protocol, or N may be related to the processing capability M reported by the terminal device (for example, N≤M).

An advantage of the scheme (c) lies in that scheduling flexibility of the cell-2 can be maintained. However, a greater processing capability is required for the cell-2, possibly leading to higher hardware costs and energy consumption.

It should be noted that specific times mentioned in the foregoing three schemes (a), (b), and (c) may be a same specific time, such as a same slot; or may be different specific times, for example, in the schemes (a), (b), and (c), monitoring an SS is performed in different slots.

Optionally, in an embodiment, a processing capability threshold $X_i$ is assigned to the i-th transmission object $A_i$ in the at least two transmission objects described in the embodiment 100, and $X_i$ does not exceed a maximum processing capability for a single transmission object. Within a second specific time, a processing capability for an SS in which the $A_i$ schedules one transmission object does not exceed $X_i$.

This embodiment may also include a self-scheduling scenario, that is, a transmission object scheduled by a specific transmission object Ai is the transmission object Ai itself.

Optionally, at least two of the $X_i$ satisfy the following relationship:

$$\sum_{1}^{N} X_i = R;$$

where
- N is a quantity of the at least two transmission objects, and N is greater than or equal to 2; and
- R is a maximum processing capability determined based on at least one of parameters of the at least two transmission objects; or
- R is a maximum processing capability determined based on a parameter of the one transmission object that is scheduled; or
- R is a maximum processing capability reported by the terminal device.

Optionally, at least two of the $X_i$ satisfy the following relationship:

$$\sum_{1}^{N} \frac{X_i}{P_i} = 1;$$

where
- N is a quantity of the at least two transmission objects, and N is greater than or equal to 2; and
- $P_i$ is a maximum processing capability determined based on a parameter of the $A_i$.

For detailed description, the following provides description with reference to an embodiment. The previous example is still used as an example, that is, a cell-1 and a cell-2 are configured for the terminal device. The cell-1 is self-scheduled, and the cell-2 can also schedule the cell-1. The terminal device monitors an SS (hereinafter referred to as SE-SS) in which the cell-1 is self-scheduled, and an SS (hereinafter referred to as CR-SS) in which the cell-2 schedules the cell-1, so as to obtain a scheduling instruction DCI for scheduling the cell-1. In addition, the terminal device may also monitor other SSs (hereinafter referred to as O-SSs) on the cell-2 to obtain scheduling DCI for scheduling the cell-2.

Optionally, within a specific time, for the scheduled cell cell-1:
- a processing capability of the terminal device for monitoring the SE-S S does not exceed a threshold $X_1$, and $X_1$ is not greater than a maximum processing capability for a single cell; and a processing capability of the terminal device for monitoring the CR-SS does not exceed a threshold $X_2$, and $X_2$ is not greater than the maximum processing capability for the single cell.

In this embodiment, a specific time for monitoring the SE-SS and a specific time for monitoring the CR-SS may be a same specific time, for example, a same slot; or may be different specific times. For example, monitoring on the SE-SS and the CR-SS is performed in different slots.

Optionally, the threshold $X_1$ and the threshold $X_2$ are related to parameters (for example, numerology/SCS) of the scheduling cell and/or the scheduled cell, for example, being determined based on an SCS of the cell-1 or cell-2 or based on a largest or smallest one of the SCSs; and so on.

Optionally, the threshold $X_1$ and the threshold $X_2$ satisfy a specific relationship:

$X_1+X_2=R$, where R is a maximum processing capability determined based on the parameter (SCS) of the cell-1 or the cell-2, or R is reported by the user.

For example, using the maximum number of PDCCH candidates as an example and assuming that the cell-1 and the cell-2 have different SCSs (cell-1: $\mu=0$, and cell-2: $\mu=1$), $X_1+X_2=44$ (for the cell-1) or $X_1+X_2=36$ (for the cell-2).

Alternatively, $X_1/P_1+X_2/P_2=1$, where $P_1$ is a maximum processing capability determined for a cell (namely, the cell-1) of the SE-SS, and $P_2$ is a maximum processing capability determined for a cell (namely, the cell-2) of the CR-SS (for details, refer to Embodiment 3 of the present disclosure hereinafter).

For example, using the maximum number of PDCCH candidates as an example and assuming that the cell-1 and the cell-2 have a same SCS ($\mu=0$), possible thresholds are $X_1=30$ and $X_2=14$, satisfying $30/44+14/44=1$ Assuming that the cell-1 and the cell-2 have different SCSs (cell-1: $\mu=0$, and cell-2: $\mu=1$), possible thresholds are $X_1=22$ and $X_2=18$, satisfying $X_1/P_1+X_2/P_2=22/44+18/36=1$.

Essence of this scheme lies in that part of a hardware processing capability for the cell-1 is allocated to the cell-2 for PDCCH monitoring, which has an advantage of maintaining high scheduling flexibility without increasing hardware costs and energy consumption.

Optionally, the threshold $X_1$ and the threshold $X_2$ are quantized integer values, that is, candidate values of $X_1$ and $X_2$ are several positive integers. For example, using the maximum number of PDCCH candidates as an example, $X_1$ is not an integer within a range of 0, ..., and 44, but is an arithmetic sequence of 0, 4, 8, ..., 40, and 44 with K as a step (for example, K=4). This can simplify implementation complexity of the terminal device.

It should be noted that the description in this embodiment uses two cells as an example, but this solution is applicable to a scenario of more than two cells, and there may alternatively be more thresholds $X_1$, such as $X_3$ and $X_4$.

Optionally, $X_1$ and $X_2$ may be predefined by a protocol, or configured by the network, or $X_1$ and $X_2$ may be related to a capability reported by the terminal device (the terminal device reports $X_1$ and $X_2$, or $X_1$ and $X_2$ are obtained through calculation based on one or more capability values reported by the terminal device). The terminal device may report only one of $X_1$ or $X_2$, and the other value is calculated based on the foregoing specific relationship that needs to be satisfied.

Optionally, in an embodiment, a processing capability $G_i$ is assigned to the i-th transmission object $A_i$ in the at least two transmission objects described in the embodiment 100, and $G_i$ does not exceed a maximum processing capability for a single transmission object. Within a third specific time, a processing capability for an SS in which the $A_i$ schedules one transmission object is $G_i$.

Optionally, at least two of the $G_i$ satisfy the following relationship:

$$\sum_{1}^{N} G_i \leq S;$$

where
- N is a quantity of the at least two transmission objects, and N is greater than or equal to 2; or
- S is a maximum processing capability determined based on at least one of parameters of the at least two transmission objects; or
- S is a maximum processing capability determined based on a parameter of the one transmission object that is scheduled.

Optionally, at least two of the $G_i$ satisfy the following relationship:

$$\sum_{1}^{N} \frac{G_i}{Q_i} \leq 1;$$

where
- N is a quantity of the at least two transmission objects, and N is greater than or equal to 2; and
- $Q_i$ is a maximum processing capability determined based on a parameter of the $A_i$.

For detailed description, the following provides description with reference to an embodiment. The previous example is still used as an example, that is, a cell-1 and a cell-2 are configured for the terminal device. The cell-1 is self-scheduled, and the cell-2 can also schedule the cell-1. The terminal device monitors an SS (hereinafter referred to as SE-SS) in which the cell-1 is self-scheduled, and an SS (hereinafter referred to as CR-SS) in which the cell-2 schedules the cell-1, so as to obtain a scheduling instruction DCI for scheduling the cell-1. In addition, the terminal device may also monitor other SSs (hereinafter referred to as O-SSs) on the cell-2 to obtain scheduling DCI for scheduling the cell-2.

Within a specific time, for the scheduled cell cell-1, a processing capability required by the terminal device for monitoring the SE-SS is $G_1$, a processing capability required by the terminal device for monitoring the CR-SS is $G_2$, and $G_1$ and $G_2$ satisfy a specific relationship:

$G_1+G_2 \leq S$, where S is a maximum processing capability determined based on a parameter (SCS) of the cell-1 or the cell-2; or $G_1/Q_1+G_2/Q_2 \leq 1$, where $Q_1$ is a maximum processing capability determined for a cell (namely, the cell-1) of the SE-SS, and $Q_2$ is a maximum processing capability determined for a cell (namely, the cell-2) of the CR-SS (for details, refer to Embodiment 4 of the present disclosure).

In this embodiment, a specific time for monitoring the SE-SS and a specific time for monitoring the CR-SS may be a same specific time, for example, a same slot; or may be different specific times. For example, monitoring on the SE-SS and the CR-SS is performed in different slots.

Optionally, $G_1$ and $G_2$ are related to a parameter (for example, numerology/SCS) of the scheduling cell and/or the scheduled cell.

Optionally, $G_1$ and $G_2$ are quantized integer values. For details, refer to the foregoing embodiments.

Optionally, in an embodiment, in the embodiment 100, within a fourth specific time, for the i-th transmission object $A_i$ in the at least two transmission objects, a processing capability for monitoring an SS in which the $A_i$ schedules one transmission object does not exceed a maximum processing capability for the $A_i$.

For detailed description, the following provides description with reference to an embodiment. The previous example is still used as an example, that is, a cell-1 and a cell-2 are configured for the terminal device. The cell-1 is self-scheduled, and the cell-2 can also schedule the cell-1. The terminal device monitors an SS (hereinafter referred to as SE-SS) in which the cell-1 is self-scheduled, and an SS (hereinafter referred to as CR-SS) in which the cell-2 schedules the cell-1, so as to obtain a scheduling instruction DCI for scheduling the cell-1. In addition, the terminal device may also monitor other SSs (hereinafter referred to as O-SSs) on the cell-2 to obtain scheduling DCI for scheduling the cell-2.

Within a specific time:
for the scheduled cell cell-1, a total processing capability of the terminal device for monitoring (the SE-SS and the CR-SS) does not exceed a maximum processing capability of the terminal device for a single scheduled cell cell-1; and
for the scheduling cell cell-2, a total processing capability of the terminal device for monitoring the CR-SS and the O-SS does not exceed a maximum processing capability of the terminal device for the single scheduling cell cell-2.

In this embodiment, a specific time for monitoring the SE-SS and the CR-SS and a specific time for monitoring the CR-SS and the O-SS may be a same specific time, for example, a same slot; or may be different specific times. For example, monitoring on the SE-SS and the CR-SS and monitoring on the CR-SS and the O-SS are performed in different slots.

In this embodiment, the network device may flexibly select one SS for scheduling, provided that the maximum processing capability is not exceeded.

Essence of this embodiment lies in dynamical allocation of a hardware processing capability for PDCCH monitoring on the cell-1 and cell-2, thereby implementing maximum scheduling flexibility.

Optionally, in an embodiment, the processing capability for monitoring the SS described in the foregoing embodiments is related to at least one of the following: a specific DCI format or size; a specific SS; a parameter of the transmission object; a configured quantity of the plurality of transmission objects; or a control resource set CORESET identifier.

That is, within a specific time, a monitoring capability allocated by the terminal device is related to at least one of a specific DCI format or size, a specific search space, a cell parameter (numerology/SCS), the number of scheduled cells, or a CORESET identifier (CORESET ID, pool ID, or the like).

In this embodiment, a monitoring capability for monitoring DCI may be a same monitoring capability for the scheduling cell or any one or more scheduled cells; or, this part of capability is formed by a portion divided from a monitoring capability for the scheduling cell and a portion divided from a monitoring capability for the scheduled cell (for details, refer to Embodiment 6 of the present disclosure hereinafter).

Optionally, in an embodiment, the specific time described in the foregoing embodiments and at least one of the specific first specific time, second specific time, third specific time, and fourth specific time include one of the following:
a specific time point;
at least one slot;
one time interval;
within a valid time of a monitoring timer; or
a physical downlink control channel PDCCH monitoring opportunity, where earliest starting positions of schedulable physical downlink shared channels PDSCHs or physical uplink shared channels PUSCHs corresponding to the PDCCH monitoring opportunity are the same. For example, the PDCCH monitoring opportunity satisfies that the earliest starting positions of the scheduled PDSCHs/PUSCHs both are N.

Optionally, in an embodiment, in the embodiment 100, before the obtaining scheduling configuration information, the method further includes: sending a terminal capability, where the terminal capability includes at least one of the following:
whether monitoring on scheduling of one transmission object by at least two transmission objects is supported;
a maximum processing capability for monitoring at least two transmission objects;
an earliest starting position of a schedulable PDSCH or PUSCH;
a length of a specific time interval; or
a length of a monitoring timer.

Optionally, in each of the foregoing embodiments, the network device may configure, for the terminal device, the foregoing configuration of the cell-1 and cell-2, an SS (including CR-SS, SE-SS, or O-SS) to be monitored, a scheduled DCI format, and the like. Optionally, the configuration needs to meet the foregoing restriction on monitoring by the terminal device; or the network device receives a capability reported by the terminal device, and performs configuration based on the capability of the terminal device.

In order to describe in detail the search space monitoring method provided in the embodiments of the present disclosure, the following provides descriptions with reference to several embodiments.

Embodiment 1

The network device configures a PCell and an SCell for the terminal device, and the SCell schedules the PCell. SCSs of the PCell and the SCell are both 15 kHz (that is, $\mu=0$).

The network device configures the number A of PDCCH candidates for an SE-SS in which the PCell is self-scheduled to be 40, the number B of PDCCH candidates for an O-SS in which the SCell is self-scheduled to be 15, and the number C of PDCCH candidates for a CR-SS in which the SCell schedules the PCell to be 20, that is, part of a processing capability for the SCell is allocated for scheduling the PCell.

The terminal device monitors the foregoing SSs simultaneously, where A<44 and B+C=35<44, both not exceeding a maximum processing capability of the terminal device within one slot.

Embodiment 2

The network device configures a PCell and an SCell for the terminal device, and the SCell schedules the PCell. SCSs of the PCell and the SCell are both 15 kHz (that is, $\mu=0$).

A cross-carrier scheduling capability N supported and reported by the terminal device is 1.5.

The network device configures the number A of PDCCH candidates for an SE-SS in which the PCell is self-scheduled to be 40, the number B of PDCCH candidates for an O-SS in which the SCell is self-scheduled to be 40, and the number C of PDCCH candidates for a CR-SS in which the SCell schedules the PCell to be 20, that is, part of a processing capability for the SCell is allocated for scheduling the PCell.

The terminal device monitors the foregoing SSs simultaneously, where A<44, B+C=60, and 60>44; however, 60<44×N=66, thereby not exceeding a maximum processing capability of the terminal device within one slot.

Embodiment 3

The network device configures a PCell and an SCell for the terminal device, and the SCell schedules the PCell. An SCS of the PCell is 15 kHz (that is, $\mu=0$), and an SCS of the SCell is 30 kHz (that is, $\mu=1$).

A threshold $X_1$ for the scheduled cell reported by the terminal device is 22, and the network device calculates $X_2=18$, satisfying 22/44+18/36=1.

The network device configures the number A of PDCCH candidates for an SE-SS in which the PCell is self-scheduled to be 20, the number B of PDCCH candidates for an O-SS in which the SCell is self-scheduled to be 20, and the number C of PDCCH candidates for a CR-SS in which the SCell schedules the PCell to be 10, that is, part of a processing capability for the SCell is allocated for scheduling the PCell.

The terminal device monitors the foregoing SSs simultaneously, where A<$X_1$=22, C<$X_2$=18, and B<36, not exceeding a maximum processing capability of the terminal device within one slot.

Embodiment 4

The network device configures a PCell and an SCell for the terminal device, and the SCell schedules the PCell. An SCS of the PCell is 15 kHz (that is, $\mu=0$), and an SCS of the SCell is 30 kHz (that is, $\mu=1$).

A threshold $X_1$ for the scheduled cell reported by the terminal device is 22, and the network device calculates $X_2=18$, satisfying 22/44+18/36=1.

The network device configures the number A of PDCCH candidates for an SE-SS in which the PCell is self-scheduled to be 20, the number B of PDCCH candidates for an O-SS in which the SCell is self-scheduled to be 20, and the number C of PDCCH candidates for a CR-SS in which the SCell schedules the PCell to be 10, that is, part of a processing capability for the SCell is allocated for scheduling the PCell.

The terminal device monitors the foregoing SSs simultaneously, where A/44+C/36=20/44+10/36<1, and B<36, thereby not exceeding a maximum processing capability of the terminal device within one slot.

Embodiment 5

The network device configures a PCell and an SCell for the terminal device, and the SCell schedules the PCell. SCSs of the PCell and the SCell are both 15 kHz (that is, $\mu=0$).

The network device configures a scaling factor N, which indicates how to allocate a maximum processing capability between cells. N=0.5, which means that half of the capability is allocated for self-scheduling of the PCell, and the other half of the capability is used for the SCell scheduling the PCell.

Based on the configured N and the SCS of the cell, the terminal device determines a capability for PDCCH monitoring in the scheduled PCell.

The maximum number of PDCCH candidates for the SE-SS in which the PCell is self-scheduled is 44×N=24, and the maximum number of PDCCH candidates for the CR-SS in which the SCell schedules the PCell is 44×N=22.

A DCI size budget for self-scheduling of the PCell is 4×N=2, a DCI size budget for the SCell scheduling the PCell is 4×N=2, that is, the number of different DCI formats for monitoring self-scheduling is 2, and the number of different DCI formats for the SCell scheduling the PCell is 2.

Embodiment 6

The network device configures a PCell and an SCell for the terminal device, where SCSs of both the PCell and the SCell are 15 kHz (that is, $\mu=0$); and a DCI-J is configured for the PCell, for scheduling data of both the PCell and the SCell.

The terminal device configures part of a monitoring capability for monitoring the DCI-J.

This part of monitoring capability may be a same monitoring capability for the PCell or the SCell, or this part of capability is formed by a portion of a monitoring capability for the PCell and a portion of a monitoring capability for the SCell.

Based on a specific proportion (scaling factor), the terminal device may report an allocation ratio to the network device, or according to a specific rule, for example, DCI-J is only for scheduling the PDSCH, the SCell self-schedules the PUSCH, or the PCell performs cross-carrier scheduling of the PUSCH on the SCell.

In this case, a scheduling capability for the PDSCH on the SCell is allocated for monitoring the DCI-J.

Embodiment 7

The network device configures the terminal device to monitor a TRP-1 (whose associated CORESET pool ID is 0)

and a TRP-2 (whose associated CORESET pool ID is 1) on the PCell. Each TRP performs self-scheduling, and the TRP-1 may also schedule the TRP-2. An SCS of the PCell is 15 kHz (that is, µ=0).

An SS-0 and an SS-1 are associated with a CORESET pool ID-0, an SS-2 is associated with a CORESET pool ID-1, the SS-0 schedules a TRP-0, and the SS-1 and the SS-2 can schedule a TRP-1.

The terminal device reports its supported cross-TRP scheduling capability L being 1, and a total scheduling capability of the two TRPs R being 1.5, that is, the maximum number of PDCCH candidates=44*R=66.

The network device configures the number A of PDCCH candidates for the SS-0 to be 20, the number B of PDCCH candidates for the SS-2 to be 20, and the number C of PDCCH candidates for the SS-1 to be 10, that is, part of a processing capability for the TRP-1 is allocated for monitoring scheduling of the TPR-2.

The terminal device monitors the foregoing SSs simultaneously, where A+B+C<66 and A+C=30<44, both not exceeding a maximum processing capability of the terminal device.

The foregoing embodiments of the present disclosure can be applied to the search space monitoring method in a CA or M-TRP scenario. Both self-scheduling of one cell (or TRP) and being scheduled by another cell (or TRP) can be supported. For example, monitoring on DCI for scheduling the PCell and that for the SCell scheduling the PCell is performed. The maximum number of PDCCH candidates blindly detected by the terminal device, the maximum number of non-overlapping CCEs, the DCI size budget, and the like are allocated between two scheduling cells, thereby simplifying implementation of the terminal device and reducing power consumption.

It should be noted that the descriptions of the foregoing embodiments are mostly made by using two cells as an example, and this solution is applicable to scenarios with more than two cells.

The descriptions of the foregoing embodiments use the cell-2 scheduling only the cell-1 and the cell-2 itself as an example, and this solution is also applicable to a scenario in which the cell-2 schedules more than two cells.

In the foregoing solution, DCI for the cell-2 scheduling the cell-1 may be DCI for scheduling one cell alone, or DCI for simultaneously/jointly scheduling a plurality of cells. For example, when the cell-2 schedules the cell-1, one piece of special DCI may be for scheduling data of two cells simultaneously.

The foregoing embodiments of the present disclosure may also be applied to a multiple transmission panel (multiple Transmission and Reception Panel, M-TRP) scenario, that is, the cell-1 and the cell-2 in the present disclosure may alternatively be a TRP-1 and a TRP-2 of the same cell, the terminal device monitors a PDCCH of an SS corresponding to different TRPs (that is, configured with different CORESET pool indexes).

It should be noted that the foregoing embodiments in this specification are described by using at least two cells scheduling one cell as an example. Actually, the foregoing embodiments are also applicable to a scenario in which at least two TRPs schedule one TRP. That is, the cells in the foregoing embodiments may be replaced with TRPs.

The foregoing describes in detail the search space monitoring method according to the embodiments of the present disclosure with reference to FIG. 1. The following describes in detail the search space monitoring method according to another embodiment of the present disclosure with reference to FIG. 2. It can be understood that interaction between the network device and the terminal device described from the network device side is the same as the description on the terminal device side in the method shown in FIG. 1. To avoid repetition, related descriptions are appropriately omitted.

Figure 2:
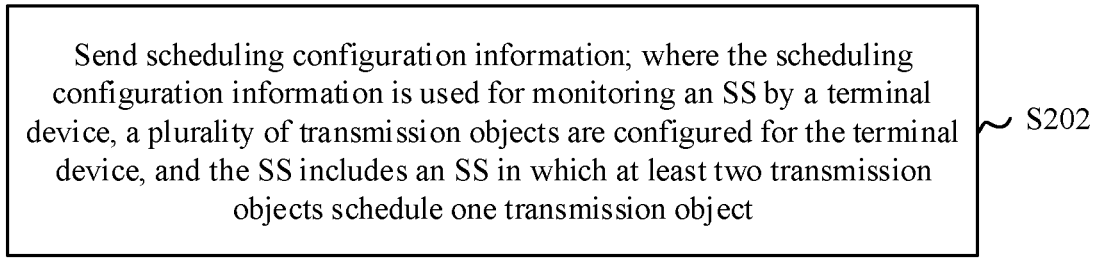
FIG. 2 is a schematic flowchart of a search space monitoring method according to another embodiment of the present disclosure.

FIG. 2 is a schematic diagram of an implementation flowchart of a search space monitoring method according to an embodiment of the present disclosure. The method may be applied to a network device side. As shown in FIG. 2, the method 200 includes the following steps.

S202: Send scheduling configuration information; where the scheduling configuration information is used for monitoring an SS by a terminal device, a plurality of transmission objects are configured for the terminal device, and the SS includes an SS in which at least two transmission objects schedule one transmission object.

According to the search space monitoring method provided in this embodiment of the present disclosure, a plurality of transmission objects (for example, a plurality of cells or a plurality of TRPs) are configured for the terminal device, to support self-scheduling of one cell (or TRP) and scheduling by another cell (or TRP), for example, supporting both self-scheduling of a PCell and scheduling the PCell by using an SCell. This resolves the problem of a limited control channel capacity (of the PCell), thereby improving communication efficiency.

Optionally, in an embodiment, the plurality of transmission objects include at least a first transmission object and a second transmission object, and the SS being monitored includes at least one of the following:
    a first SS in which the first transmission object is self-scheduled;
    a second SS in which the second transmission object schedules the first transmission object; or
    a third SS in which the second transmission object is self-scheduled.

Optionally, in an embodiment, before the sending scheduling configuration information, the method further includes: receiving a terminal capability, where the terminal capability includes at least one of the following:
    whether monitoring on scheduling of one transmission object by at least two transmission objects is supported;
    a maximum processing capability for monitoring at least two transmission objects;
    an earliest starting position of a schedulable PDSCH or PUSCH;
    a length of a specific time interval; or
    a length of a monitoring timer.

The foregoing describes in detail the search space monitoring method according to the embodiments of the present disclosure with reference to FIG. 1 and FIG. 2. The following describes in detail a terminal device according to an embodiment of the present disclosure with reference to FIG. 3.

Figure 3:
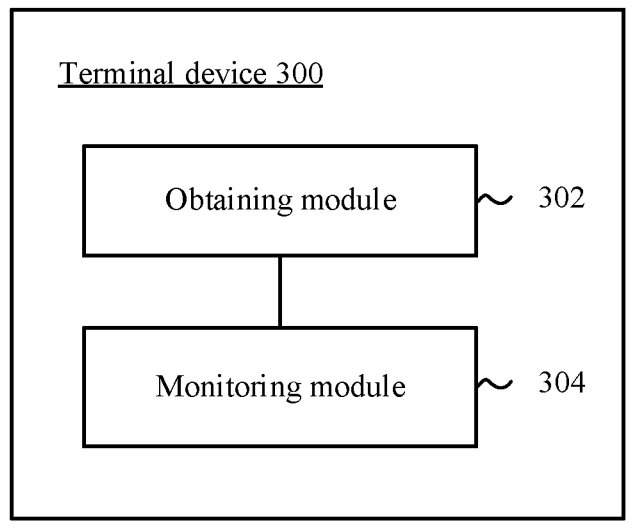
FIG. 3 is a schematic structural diagram of a terminal device according to an embodiment of the present disclosure.

FIG. 3 is a schematic structural diagram of a terminal device according to an embodiment of the present disclosure. A plurality of transmission objects are configured for the terminal device. As shown in FIG. 3, the terminal device 300 includes:
    an obtaining module 302, configured to obtain scheduling configuration information; and
    a monitoring module 304, configured to monitor an SS based on the scheduling configuration information, where the SS includes an SS in which at least two transmission objects schedule one transmission object.

A plurality of transmission objects (for example, a plurality of cells or a plurality of TRPs) are configured for the terminal device provided in this embodiment of the present disclosure, to support self-scheduling of one cell (or TRP) and scheduling by another cell (or TRP), for example, supporting both self-scheduling of a PCell and scheduling the PCell by using an SCell. This resolves the problem of a limited control channel capacity (of the PCell), thereby improving communication efficiency.

Optionally, in an embodiment, the plurality of transmission objects include at least a first transmission object and a second transmission object, and the SS being monitored includes at least one of the following:
- a first SS in which the first transmission object is self-scheduled;
- a second SS in which the second transmission object schedules the first transmission object; or
- a third SS in which the second transmission object is self-scheduled.

Optionally, in an embodiment, at least one of the following is satisfied within a first specific time:
- a processing capability for monitoring the first SS does not exceed a maximum processing capability for a single transmission object;
- a total processing capability for monitoring the second SS and the third SS does not exceed a maximum processing capability for a single transmission object; or
- a total processing capability for monitoring the second SS and the third SS does not exceed L multiplied by a maximum processing capability for a single transmission object, where L is a positive number.

Optionally, in an embodiment, L is less than or equal to the number of transmission objects scheduled by the second transmission object.

Optionally, in an embodiment, L is predefined; or

L is related to a maximum processing capability M reported by the terminal device.

Optionally, in an embodiment, a processing capability threshold $A_i$ is assigned to the i-th transmission object $X_i$ in the at least two transmission objects, and $X_i$ does not exceed a maximum processing capability for a single transmission object; and
- within a second specific time, a processing capability for an SS in which the $A_i$ schedules one transmission object does not exceed $X_i$.

Optionally, in an embodiment, at least two of the $X_i$ satisfy the following relationship:

$$\sum_{1}^{N} X_i = R;$$

where
- N is a quantity of the at least two transmission objects, and N is greater than or equal to 2; and
- R is a maximum processing capability determined based on at least one of parameters of the at least two transmission objects; or
- R is a maximum processing capability determined based on a parameter of the one transmission object that is scheduled; or
- R is a maximum processing capability reported by the terminal device.

Optionally, in an embodiment, at least two of the $X_i$ satisfy the following relationship:

$$\sum_{1}^{N} \frac{X_i}{P_i} = 1;$$

where
- N is a quantity of the at least two transmission objects, and N is greater than or equal to 2; and
- $P_i$ is a maximum processing capability determined based on a parameter of the $A_i$.

Optionally, in an embodiment, a processing capability $G_i$ is assigned to the i-th transmission object $A_i$ in the at least two transmission objects, and $G_i$ does not exceed a maximum processing capability for a single transmission object; and
- within a third specific time, a processing capability for an SS in which the $A_i$ schedules one transmission object is $G_i$.

Optionally, in an embodiment, at least two of the $G_i$ satisfy the following relationship:

$$\sum_{1}^{N} G_i \leq S;$$

where
- N is a quantity of the at least two transmission objects, and N is greater than or equal to 2; and
- S is a maximum processing capability determined based on at least one of parameters of the at least two transmission objects; or
- S is a maximum processing capability determined based on a parameter of the one transmission object that is scheduled.

Optionally, in an embodiment, at least two of the $G_i$ satisfy the following relationship:

$$\sum_{1}^{N} \frac{G_i}{Q_i} \leq 1;$$

where
- N is a quantity of the at least two transmission objects, and N is greater than or equal to 2; and
- $Q_i$ is a maximum processing capability determined based on a parameter of the $A_i$.

Optionally, in an embodiment, within a fourth specific time, for the i-th transmission object $A_i$ in the at least two transmission objects, a processing capability for monitoring an SS in which the $A_i$ schedules one transmission object does not exceed a maximum processing capability for the $A_i$.

Optionally, in an embodiment, a processing capability for monitoring the SS is related to at least one of the following: a specific downlink control information DCI format or size; a specific SS; a parameter of the transmission object; a configured quantity of the plurality of transmission objects; or a control resource set CORESET identifier.

Optionally, in an embodiment, at least one of the first specific time, the second specific time, the third specific time, and the fourth specific time includes one of the following:

a specific time point;

at least one slot;

one time interval;

within a valid time of a monitoring timer; or a PDCCH monitoring opportunity, where earliest starting positions of schedulable PDSCHs or PUSCHs corresponding to the PDCCH monitoring opportunity are the same.

Optionally, in an embodiment, the scheduling configuration information is used to configure at least one of the following configuration of the plurality of transmission objects, an SS to be monitored, and a DCI format for scheduling.

Optionally, in an embodiment, the terminal device 300 further includes a sending module, configured to send a terminal capability, and the terminal capability includes at least one of the following:

whether monitoring on scheduling of one transmission object by at least two transmission objects is supported;

a maximum processing capability for monitoring at least two transmission objects;

an earliest starting position of a schedulable PDSCH or PUSCH;

a length of a specific time interval; or a length of a monitoring timer.

For the terminal device 300 in this embodiment of the present disclosure, refer to the processes of the method 100 in the corresponding embodiment of the present disclosure, and the units or modules of the terminal device 300 and other operations and/or functions described above are used to implement the corresponding processes in the method 100, with the same or equivalent technical effects achieved. For brevity, details are not repeated herein.

Figure 4:
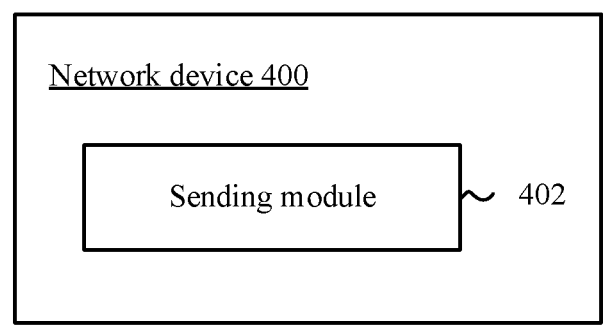
FIG. 4 is a schematic structural diagram of a network device according to an embodiment of the present disclosure.

FIG. 4 is a schematic structural diagram of a network device according to an embodiment of the present disclosure. As shown in FIG. 4, the network device 400 includes:

a sending module 402, configured to send scheduling configuration information; where the scheduling configuration information is used for monitoring an SS by a terminal device, a plurality of transmission objects are configured for the terminal device, and the SS includes an SS in which at least two transmission objects schedule one transmission object.

In this embodiment of the present disclosure, a plurality of transmission objects (for example, a plurality of cells or a plurality of TRPs) are configured for the terminal device, to support self-scheduling of one cell (or TRP) and scheduling by another cell (or TRP), for example, supporting both self-scheduling of a PCell and scheduling the PCell by using an SCell. This resolves the problem of a limited control channel capacity (of the PCell), thereby improving communication efficiency.

Optionally, in an embodiment, the plurality of transmission objects include at least a first transmission object and a second transmission object, and the SS being monitored includes at least one of the following:

a first SS in which the first transmission object is self-scheduled;

a second SS in which the second transmission object schedules the first transmission object; or a third SS in which the second transmission object is self-scheduled.

Optionally, in an embodiment, the network device 400 further includes a receiving module that may be configured to receive a terminal capability, and the terminal capability includes at least one of the following:

whether monitoring on scheduling of one transmission object by at least two transmission objects is supported;

a maximum processing capability for monitoring at least two transmission objects;

an earliest starting position of a schedulable PDSCH or PUSCH;

a length of a specific time interval; or a length of a monitoring timer.

For the network device 400 in this embodiment of the present disclosure, refer to the processes of the method 200 in the corresponding embodiment of the present disclosure, and the units or modules of the network device 400 and other operations and/or functions described above are used to implement the corresponding processes in the method 200, with the same or equivalent technical effects achieved. For brevity, details are not repeated herein.

All the embodiments in this specification are described in a progressive manner. Each embodiment focuses on differences from other embodiments. For the part that is the same or similar between different embodiments, reference may be made between the embodiments. The device embodiment is essentially similar to the method embodiment, and therefore is described briefly. For related information, refer to descriptions of the related parts in the method embodiment.

Figure 5:
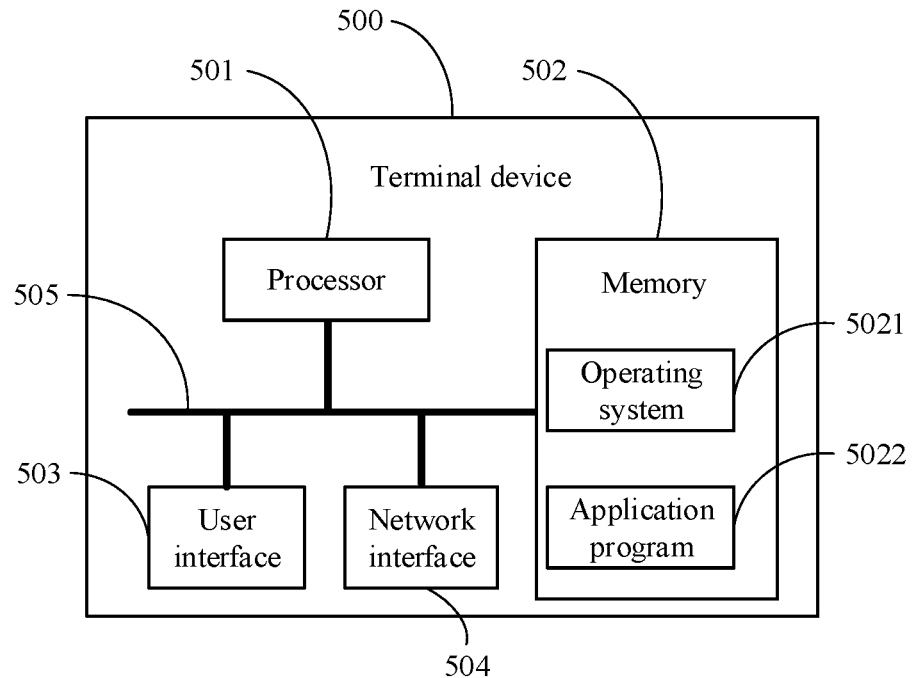
FIG. 5 is a schematic structural diagram of a terminal device according to another embodiment of the present disclosure.

FIG. 5 is a block diagram of a terminal device according to another embodiment of the present disclosure. The terminal device 500 shown in FIG. 5 includes at least one processor 501, a memory 502, at least one network interface 504, and a user interface 503. The components of the terminal device 500 are coupled together by using a bus system 505. It can be understood that the bus system 505 is configured to implement connection communication between these components. The bus system 505 may include not only a data bus but also a power supply bus, a control bus, and a status signal bus. However, for clarity of description, various types of buses in FIG. 5 are marked as the bus system 505.

The user interface 503 may include a display, a keyboard, a click device (for example, a mouse or a trackball), a touch board, or a touchscreen.

It can be understood that the memory 502 in this embodiment of the present disclosure may be a volatile memory or a nonvolatile memory, or may include both a volatile memory and a nonvolatile memory. The non-volatile memory may be a read-only memory (ROM), a programmable read only memory (Programmable ROM, PROM), an erasable programmable read-only memory (Erasable PROM, EPROM), and an electrically erasable programmable read-only memory (Electrically EPROM, EEPROM), or flash memory. The volatile memory may be a random access memory (RAM), and the RAM is used as an external cache. As exemplary rather than restrictive description, many forms of RAM can be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct Rambus random access memory (Direct Rambus RAM, DRRAM). The memory 502 in the system and method described in the embodiments of the present disclosure is intended to include but is not limited to these and any other suitable types of memories.

In some implementations, the memory 502 stores the following elements: an executable module or a data structure, or a subset thereof, or an extended set thereof: an operating system 5021 and an application program 5022.

The operating system 5021 includes various system programs, such as a framework layer, a kernel library layer, and a driver layer, and is configured to implement various basic services and process hardware-based tasks. The application program 5022 includes various application programs, such as a media player and a browser, and is configured to implement various application services. A program that implements the methods of the embodiments of the present disclosure may be included in the application program 5022.

In this embodiment of the present disclosure, the terminal device 500 further includes a computer program stored in the memory 502 and capable of running on the processor 501. When being executed by the processor 501, the computer program implements the steps of the following method embodiment 100.

The method disclosed in the embodiment of the present disclosure is applicable to a processor 501, or implemented by the processor 501. The processor 501 may be an integrated circuit chip with a signal processing capability. In an implementation process, the steps in the foregoing method may be implemented by using a hardware integrated logic circuit in the processor 501, or by using instructions in a form of software. The foregoing processor 501 may be a general processor, a digital signal processor (DSP), an application-specific integrated circuit ASIC), a field programmable gate array (FPGA) or another programmable logic device, a discrete gate or transistor logic device, or a discrete hardware component. It may implement or perform the methods, the steps, and logical block diagrams that are disclosed in the embodiments of the present disclosure. The general-purpose processor may be a microprocessor or any regular processor. Steps of the methods disclosed with reference to the embodiments of the present disclosure may be directly performed by a hardware decoding processor, or may be performed by using a combination of hardware and software modules in the decoding processor. The software module may be located in a computer-readable storage medium that is mature in the art, such as a random access memory, a flash memory, a read-only memory, a programmable read-only memory, or an electrically erasable programmable memory, or a register. The computer-readable storage medium is located in the memory 502, and the processor 501 reads information in the memory 502 and implements, in combination with its hardware, the steps of the foregoing methods. Specifically, a computer program is stored in the computer-readable storage medium, and when the computer program is executed by the processor 501, the steps of the embodiments of the foregoing method 100 are implemented.

It can be understood that the embodiments described in the present disclosure may be implemented by hardware, software, firmware, middleware, microcode, or a combination thereof For hardware implementation, the processing unit may be implemented in one or more application specific integrated circuits (ASIC), digital signal processors (DSP), digital signal processing devices (DSP Device, DSPD), programmable logic devices (PLD), field-programmable gate arrays (FPGA), general purpose processors, controllers, microcontrollers, microprocessors, and other electronic units for performing the functions described in this disclosure, or a combination thereof.

For software implementation, the technologies described in the embodiments of the present disclosure may be implemented by modules (for example, processes or functions) that perform the functions described in the embodiments of the present disclosure. Software code may be stored in the memory and executed by the processor. The memory may be implemented in or outside the processor.

The terminal device 500 is capable of implementing the processes that are implemented by the terminal device in the foregoing embodiments, with the same or equivalent technical effects achieved. To avoid repetition, details are not described herein again.

Figure 6:
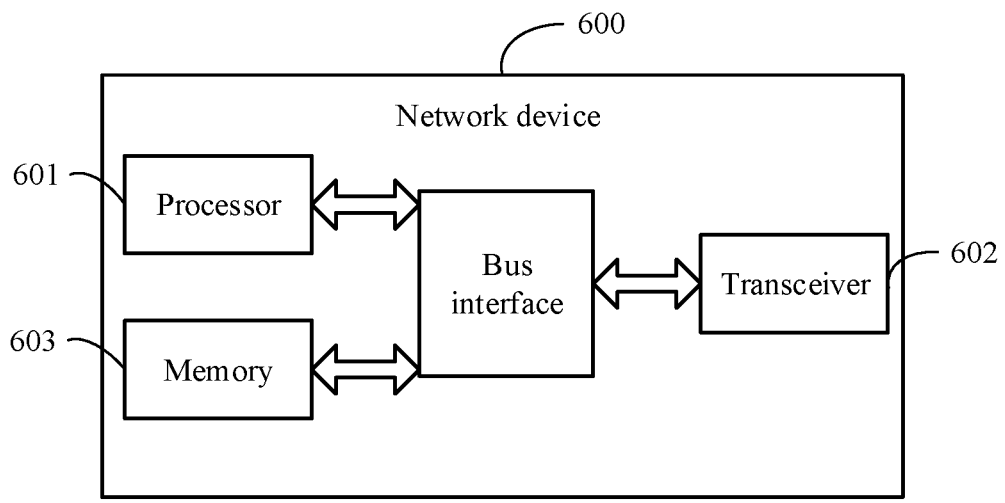
FIG. 6 is a schematic structural diagram of a network device according to another embodiment of the present disclosure.

Referring to FIG. 6, FIG. 6 is a structural diagram of a network device to which the embodiments of the present disclosure are applied. Details of the method embodiment 200 can be implemented to achieve the same effects. As shown in FIG. 6, the network device 600 includes a processor 601, a transceiver 602, a memory 603, and a bus interface.

In this embodiment of the present disclosure, the network device 600 further includes a computer program stored in the memory 603 and capable of running on the processor 601. When the computer program is executed by the processor 601, the steps of the method embodiment 200 are implemented.

In FIG. 6, a bus architecture may include any quantity of interconnected buses and bridges, specifically for interconnecting various circuits of one or more processors represented by the processor 601 and a memory represented by the memory 603. The bus architecture may further interconnect various other circuits such as a peripheral device, a voltage regulator, and a power management circuit. These are all well known in the art, and therefore are not further described in this specification. The bus interface provides an interface. The transceiver 602 may be a plurality of components, that is, the transceiver 602 includes a transmitter and a receiver, and provides a unit for communicating with various other apparatuses on a transmission medium.

The processor 601 is responsible for bus architecture management and general processing. The memory 603 may store data used when the processor 601 performs an operation.

An embodiment of the present disclosure further provides a computer-readable storage medium, where a computer program is stored in the computer-readable storage medium. When the computer program is executed by a processor, the processes of any one of the foregoing method embodiment 100 and the foregoing method embodiment 200 are implemented, with the same technical effects achieved. To avoid repetition, details are not described herein again. The computer-readable storage medium is, for example, a read-only memory (ROM), a random access memory (RAM), a magnetic disk, or an optical disc.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present disclosure essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

Some embodiments of the present disclosure have been described with reference to the attached drawings; however, the present disclosure is not limited to the aforesaid embodiments, and these embodiments are merely illustrative but are not intended to limit the present disclosure. Persons of ordinary skill in the art may further derive many other implementations according to the teachings of the present disclosure and within the scope defined in the claims, and all of the implementations shall fall within the scope of the present disclosure.

What is claimed is:

1. A search space monitoring method, wherein the method is executed by a terminal device, a plurality of transmission objects are configured for the terminal device, and the method comprises:
   obtaining scheduling configuration information; and
   monitoring a search space (SS) based on the scheduling configuration information, wherein the SS comprises an SS in which a first transmission object in the plurality of transmission objects is scheduled by at least two transmission objects in the plurality of transmission objects, the at least two transmission objects comprise the first transmission object and a second transmission object which is different from the first transmission object;
   wherein a processing capability threshold $X_i$ is assigned to the i-th transmission object $A_i$ in the at least two transmission objects, and $X_i$ does not exceed a maximum processing capability for a single transmission object; and
   within a second specific time, a processing capability for an SS in which the $A_i$ schedules one transmission object does not exceed $X_i$.

2. The method according to claim 1, wherein the SS being monitored comprises at least one of the following:
   a first SS in which the first transmission object is self-scheduled;
   a second SS in which the second transmission object schedules the first transmission object; or
   a third SS in which the second transmission object is self-scheduled.

3. The method according to claim 2, wherein at least one of the following is satisfied within a first specific time:
   a processing capability for monitoring the first SS does not exceed the maximum processing capability for the single transmission object;
   a total processing capability for monitoring the second SS and the third SS does not exceed the maximum processing capability for the single transmission object; or
   a total processing capability for monitoring the second SS and the third SS does not exceed L multiplied by the maximum processing capability for the single transmission object, wherein L is a positive number;

wherein the first specific time comprises one of the following:
   a specific time point;
   at least one slot;
   one time interval;
   within a valid time of a monitoring timer; or
   a physical downlink control channel (PDCCH) monitoring opportunity, wherein earliest starting positions of schedulable physical downlink shared channels (PDSCHs) or physical uplink shared channels (PUSCHs) corresponding to the PDCCH monitoring opportunity are the same.

4. The method according to claim 3, wherein L is less than or equal to the number of transmission objects scheduled by the second transmission object; or
   L is predefined; or
   L is related to a maximum processing capability M reported by the terminal device.

5. The method according to claim 1, wherein
   each of the plurality of transmission objects comprises a cell.

6. The method according to claim 1, wherein at least two of the $X_i$ satisfy the following relationship:

$$\sum_1^N X_i = R;$$

wherein
   N is a quantity of the at least two transmission objects, and N is greater than or equal to 2; and
   R is a maximum processing capability determined based on at least one of parameters of the at least two transmission objects; or
   R is a maximum processing capability determined based on a parameter of the first transmission object that is scheduled; or
   R is a maximum processing capability reported by the terminal device;
or
wherein at least two of the $X_i$ satisfy the following relationship:

$$\sum_1^N \frac{X_i}{P_i} = 1;$$

wherein
   N is a quantity of the at least two transmission objects, and N is greater than or equal to 2; and
   $P_i$ is a maximum processing capability determined based on a parameter of the $A_i$.

7. The method according to claim 1, wherein
   a processing capability $G_i$ is assigned to the i-th transmission object $A_i$ in the at least two transmission objects, and $G_i$ does not exceed the maximum processing capability for the single transmission object; and
   within a third specific time, a processing capability for an SS in which the $A_i$ schedules one transmission object is $G_i$;
   wherein the third specific time comprises one of the following:
   a specific time point;
   at least one slot;
   one time interval;
   within a valid time of a monitoring timer; or a physical downlink control channel (PDCCH) monitoring opportunity, wherein earliest starting positions of schedulable physical downlink shared channels (PDSCHs) or physical uplink shared channels (PUSCHs) corresponding to the PDCCH monitoring opportunity are the same.

8. The method according to claim 7, wherein at least two of the $C_i$ satisfy the following relationship:

$$\sum_{1}^{N} C_i \leq S;$$

wherein

N is a quantity of the at least two transmission objects, and N is greater than or equal to 2; and S is a maximum processing capability determined based on at least one of parameters of the at least two transmission objects; or S is a maximum processing capability determined based on a parameter of the first transmission object that is scheduled;

or wherein at least two of the $C_i$ satisfy the following relationship:

$$\sum_{1}^{N} \frac{C_i}{C_i'} \leq 1;$$

wherein

N is a quantity of the at least two transmission objects, and N is greater than or equal to 2; and $C_i'$ is a maximum processing capability determined based on a parameter of the $A_i$.

9. The method according to claim 1, wherein a processing capability for monitoring the SS is related to at least one of the following:
a specific downlink control information (DCI) format or size; a specific SS; a parameter of the transmission object; a configured quantity of the plurality of transmission objects; or a control resource set (CORESET) identifier.

10. The method according to claim 6, wherein the first specific time comprises one of the following:
a specific time point;
at least one slot;
one time interval;
within a valid time of a monitoring timer; or
a physical downlink control channel (PDCCH) monitoring opportunity, wherein earliest starting positions of schedulable physical downlink shared channels (PDSCHs) or physical uplink shared channels (PUSCHs) corresponding to the PDCCH monitoring opportunity are the same.

11. The method according to claim 1, wherein the scheduling configuration information is used to configure at least one of the following:
configuration of the plurality of transmission objects, an SS to be monitored, or a DCI format for scheduling.

12. The method according to claim 1, wherein before the obtaining scheduling configuration information, the method further comprises: sending a terminal capability, wherein the terminal capability comprises at least one of the following:

whether monitoring on the SS in which the first transmission object is scheduled by the at least two transmission objects is supported;
a maximum processing capability for monitoring the at least two transmission objects;
an earliest starting position of a schedulable PDSCH or PUSCH;
a length of a specific time interval; or
a length of a monitoring timer.

13. A search space monitoring method, wherein the method is executed by a network device, and the method comprises:
sending scheduling configuration information; wherein the scheduling configuration information is used for monitoring an SS by a terminal device, a plurality of transmission objects are configured for the terminal device, and the SS comprises an SS in which a first transmission object in the plurality of transmission objects is scheduled by at least two transmission objects in the plurality of transmission objects, the at least two transmission objects comprise the first transmission object and a second transmission object which is different from the first transmission object;
wherein a processing capability threshold $X_i$ is assigned to the i-th transmission object $A_i$ in the at least two transmission objects, and $X_i$ does not exceed a maximum processing capability for a single transmission object; and
within a second specific time, a processing capability for an SS in which the $A_i$ schedules one transmission object does not exceed $X_i$.

14. The method according to claim 13, wherein the SS being monitored comprises at least one of the following:
a first SS in which the first transmission object is self-scheduled;
a second SS in which the second transmission object schedules the first transmission object; or
a third SS in which the second transmission object is self-scheduled.

15. The method according to claim 13, wherein before the sending scheduling configuration information, the method further comprises: receiving a terminal capability, wherein the terminal capability comprises at least one of the following:
whether monitoring on the SS in which the first transmission object is scheduled by the at least two transmission objects is supported;
a maximum processing capability for monitoring the at least two transmission objects;
an earliest starting position of a schedulable PDSCH or PUSCH;
a length of a specific time interval; or
a length of a monitoring timer.

16. A terminal device, comprising a memory, a processor, and a computer program stored in the memory and capable of running on the processor, wherein a plurality of transmission objects are configured for the terminal device, and when the computer program is executed by the processor, the following step are implemented:
obtaining scheduling configuration information; and
monitoring a search space (SS) based on the scheduling configuration information, wherein the SS comprises an SS in which a first transmission object in the plurality of transmission objects is scheduled by at least two transmission objects in the plurality of transmission objects, the at least two transmission objects comprise the first transmission object and a second transmission object which is different from the first transmission object;

wherein a processing capability threshold $X_i$ is assigned to the i-th transmission object $A_i$ in the at least two transmission objects, and $X_i$ does not exceed a maximum processing capability for a single transmission object; and within a second specific time, a processing capability for an SS in which the $A_i$ schedules one transmission object does not exceed $X_i$.

17. The terminal device according to claim 16, wherein the SS being monitored comprises at least one of the following:
   a first SS in which the first transmission object is self-scheduled;
   a second SS in which the second transmission object schedules the first transmission object; or
   a third SS in which the second transmission object is self-scheduled.

18. The terminal device according to claim 16, wherein each of the plurality of transmission objects comprises a cell.

19. The terminal device according to claim 16, wherein a processing capability $G_i$ is assigned to the i-th transmission object $A_i$ in the at least two transmission objects, and $G_i$ does not exceed the maximum processing capability for the single transmission object; and within a third specific time, a processing capability for an SS in which the $A_i$ schedules one transmission object is $G_i$.

20. A network device, comprising a memory, a processor, and a computer program stored in the memory and capable of running on the processor, wherein when the computer program is executed by the processor, the steps of the search space monitoring method according to claim 13 is implemented.

* * * * *